United States Patent
Murakami et al.

(10) Patent No.: US 9,416,683 B2
(45) Date of Patent: *Aug. 16, 2016

(54) CARBON DIOXIDE RECOVERY METHOD AND CARBON-DIOXIDE-RECOVERY-TYPE STEAM POWER GENERATION SYSTEM

(71) Applicant: KABUSHIKI KAISHA TOSHIBA, Tokyo (JP)

(72) Inventors: Yuya Murakami, Tokyo (JP); Nobuo Okita, Ibaraki (JP); Takeo Takahashi, Kanagawa (JP); Mikio Takayanagi, Tokyo (JP); Takeo Suga, Kanagawa (JP); Takeshi Sasanuma, Kanagawa (JP); Toshihisa Kiyokuni, Kanagawa (JP); Hideo Kitamura, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 188 days.

This patent is subject to a terminal disclaimer.

(21) Appl. No.: 14/229,572

(22) Filed: Mar. 28, 2014

(65) Prior Publication Data

US 2014/0208749 A1    Jul. 31, 2014

Related U.S. Application Data

(63) Continuation of application No. 13/279,044, filed on Oct. 21, 2011, now Pat. No. 8,726,662.

(30) Foreign Application Priority Data

Oct. 22, 2010  (JP) ................................. 2010-237573

(51) Int. Cl.
*F01K 13/00* (2006.01)
*F01K 25/10* (2006.01)
*F01K 25/06* (2006.01)

(52) U.S. Cl.
CPC .................. *F01K 13/00* (2013.01); *F01K 25/06* (2013.01); *F01K 25/103* (2013.01); *Y02C 10/06* (2013.01); *Y02E 20/14* (2013.01)

(58) Field of Classification Search
CPC ....... F01K 13/00; F01K 25/103; F01K 25/06; Y02E 20/14; Y02C 10/06
USPC ...................... 60/646, 653, 677–679; 96/236; 423/220; 110/215, 234
See application file for complete search history.

(56) References Cited

U.S. PATENT DOCUMENTS 5,344,627 A    9/1994  Fujii et al.
5,467,722 A    11/1995  Meratla
(Continued)

FOREIGN PATENT DOCUMENTS

CN    101610828 A    12/2009
CN    101761368 A    6/2010
(Continued)

OTHER PUBLICATIONS

Chinese Office Action dated Oct. 20, 2014, filed in Chinese counterpart Application No. 201110322361.4, 23 pages (with translation).
(Continued)

*Primary Examiner* — Hoang Nguyen
(74) *Attorney, Agent, or Firm* — Patterson & Sheridan, LLP (57) ABSTRACT

According to one embodiment, a carbon-dioxide-recovery-type steam power generation system comprises a boiler that produces steam and generates an exhaust gas, a first turbine that is rotationally driven by the steam, an absorption tower allows carbon dioxide contained in the exhaust gas to be absorbed into an absorption liquid, a regeneration tower that discharges the carbon dioxide gas from the absorption liquid supplied from the absorption tower, a condenser that removes moisture from the carbon dioxide gas, discharged from the regeneration tower, by condensing the carbon dioxide gas using cooling water, a compressor that compresses the carbon dioxide gas from which the moisture is removed by the condenser, and a second turbine that drives the compressor. The steam produced by the cooling water recovering the heat from the carbon dioxide gas in the condenser is supplied to the first turbine or the second turbine.

14 Claims, 7 Drawing Sheets

(56) References Cited

U.S. PATENT DOCUMENTS

| | | |
|---|---|---|
| 6,883,327 B2 | 4/2005 | Iijima et al. |
| 7,488,463 B2 | 2/2009 | Iijima et al. |
| 8,091,361 B1 | 1/2012 | Lang |
| 8,726,662 B2 * | 5/2014 | Murakami ............... F01K 13/00 423/220 |
| 2007/0256559 A1 | 11/2007 | Chen et al. |
| 2010/0050637 A1 | 3/2010 | Yamashita et al. |

FOREIGN PATENT DOCUMENTS

| | | | |
|---|---|---|---|
| EP | 1473072 A1 | 11/2004 | |
| JP | 08257355 A1 | 10/1996 | |
| JP | 2004323339 A | 11/2004 | |
| JP | 2010151112 A | 7/2010 | |
| WO | 2008063082 A2 | 5/2008 | |
| WO | 2010104547 A2 | 9/2010 | |

OTHER PUBLICATIONS

Canadian Office Action issued Apr. 16, 2013 for corresponding Canadian Application No. 2,756,157, 2 pages.

Japanese Office Action dated Feb. 21, 2014, filed in Japanese counterpart Application No. 2010-237573, 6 pages (with translation).

Canadian Office Action dated Aug. 7, 2014, filed in Canadian counterpart Application No. 2,756,157, 2 pages.

Australian Office Action dated Oct. 22, 2015, filed in Australian counterpart Application No. 2014200927, 2 pages.

* cited by examiner

CARBON DIOXIDE RECOVERY METHOD AND CARBON-DIOXIDE-RECOVERY-TYPE STEAM POWER GENERATION SYSTEM

CROSS REFERENCE TO RELATED APPLICATION

This application is a continuation of U.S. patent application Ser. No. 13/279,044, filed on Oct. 21, 2011, which is based upon and claims the benefit of priority from the prior Japanese Patent Application No. 2010-237573, filed on Oct. 22, 2010, the entire contents of each of which are incorporated herein by reference.

FIELD

Embodiments described herein relate generally to a carbon-dioxide-recovery-type steam power generation system and a carbon dioxide recovery method.

BACKGROUND

In a power generation system such as a thermal power plant using a large amount of fossil fuel, an amine absorption method is employed as a method of removing and recovering carbon dioxide that is one of causes of global warming.

However, in the amine absorption method, thermal energy obtained from a great amount of steam having low pressure (for example, approximately 0.3 MPa) is required to regenerate an absorption liquid having absorbed carbon dioxide. In order to compensate this thermal energy, there is proposed a method of joining condensate, which is branched from a turbine condensate system, to a deaerator after performing heat exchanging between the amount of heat of absorbed carbon dioxide and the amount of heat generated by compressing carbon dioxide to high pressure (for example, approximately 8 MPa) that is suitable for injecting carbon dioxide into the ground.

However, there has been a problem in that the amount of condensate is not enough to recover the total amount of heat of carbon dioxide. As a result, the amount of condensate flowing in a low-pressure heater is reduced, the amount of gas extracted from a turbine is reduced, and the heat dumped to a steam condenser is increased, so that the effect of a regeneration cycle in the related art is decreased. For this reason, there has been a problem in that the output of the turbine is not particularly increased by the amount of recovered heat.

Further, in the injection of the recovered carbon dioxide into the ground, carbon dioxide needs to be compressed to be a high pressure. However, in order to ensure the power source of such a compression, the output of the power plant is excessively and inevitably decreased.

DETAILED DESCRIPTION

According to one embodiment, a carbon-dioxide-recovery-type steam power generation system comprises a boiler that produces steam and generates an exhaust gas by combusting fuel, a first turbine that is connected to a generator and is rotationally driven by the steam supplied from the boiler, an absorption tower that is supplied with the exhaust gas from the boiler and allows carbon dioxide contained in the exhaust gas to be absorbed into an absorption liquid, a regeneration tower that is supplied with the absorption liquid absorbing the carbon dioxide from the absorption tower, discharges a carbon dioxide gas from the absorption liquid, and discharges the carbon dioxide gas, a reboiler that heats the absorption liquid from the regeneration tower and supplies the generated steam to the regeneration tower, a condenser that removes moisture from the carbon dioxide gas, discharged from the regeneration tower, by condensing the carbon dioxide gas using cooling water, a compressor that compresses the carbon dioxide gas from which the moisture is removed by the condenser, and a second turbine that drives the compressor. The steam produced by the cooling water recovering the heat from the carbon dioxide gas in the condenser is supplied to the first turbine or the second turbine.

Embodiments will now be explained with reference to the accompanying drawings.

(First Embodiment)

Figure 1:
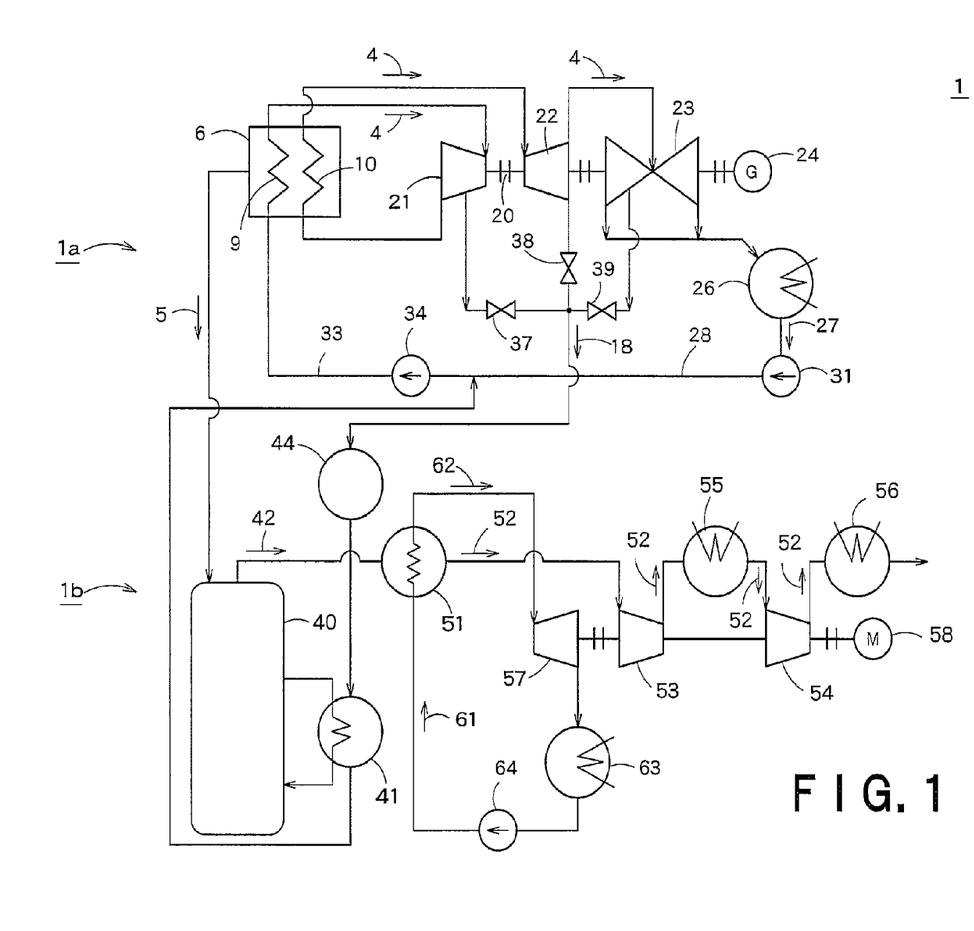
FIG. 1 is a diagram illustrating the schematic structure of a carbon-dioxide-recovery-type steam power generation system according to a first embodiment.

FIG. 1 illustrates an overall structure of a carbon-dioxide-recovery-type steam power generation system according to a first embodiment. A carbon-dioxide-recovery-type steam power generation system 1 includes a steam power generation plant is that produces turbine steam 4 through the combustion of fuel and generates power by rotationally driving a turbine and a carbon dioxide recovery plant 1b that recovers carbon dioxide from an exhaust gas 5 produced in a boiler 6 by using an absorption liquid which absorbs carbon dioxide contained in the exhaust gas 5.

The boiler 6 is supplied with fuel and air for combustion and fuel is combusted in a furnace, so that the turbine steam 4 is produced and the exhaust gas 5 is generated. The boiler 6 includes a superheater 9 that generates main steam by heating the turbine steam 4 through the combustion in the furnace and a reheater 10 that is provided adjacent to the superheater 9 and generates reheat steam by reheating the turbine steam 4 which is supplied from the superheater 9 through a high-pressure steam turbine 21 to be described below.

The steam power generation plant is includes a high-pressure steam turbine (high-pressure turbine) 21 that is rotationally driven by the turbine steam 4 (main steam) supplied from the superheater 9 of the boiler 6 and an intermediate-pressure steam turbine (intermediate-pressure turbine) 22 that is connected to the high-pressure turbine 21 by a turbine shaft 20 and is rotationally driven by the turbine steam 4 (reheat steam) supplied from the high-pressure turbine through the reheater 10 of the boiler 6. Further, a low-pressure steam turbine (low-pressure turbine) 23 is connected to the intermediate-pressure turbine 22 by the turbine shaft 20, and the low-pressure turbine 23 is configured to be rotationally driven by the turbine steam 4 (exhaust steam (intermediate-pressure exhaust steam) from the intermediate-pressure turbine 22) supplied from the intermediate-pressure turbine 22. Furthermore, a generator 24, which generates power by the rotation of the turbine shaft 20, is connected to the turbine shaft 20.

Furthermore, in the embodiment, the rotating shafts of the high-pressure turbine 21, the intermediate-pressure turbine 22, the low-pressure turbine 23, and the generator 24 are connected to each other so as to form one turbine shaft 20.

However, the embodiment is not limited to this structure. The steam power generation plant 1a may include two or more turbine shafts each including at least one steam turbine and a plurality of generators connected to the respective turbine shafts.

A steam condenser 26, which generates condensate 27 by cooling and condensing the turbine steam (exhaust steam (low-pressure exhaust steam) from the low-pressure turbine 23) discharged from the low-pressure turbine 23, is provided below the low-pressure turbine 23. The condensate 27 discharged from the steam condenser 26 is sent to the downstream side of a line 28 by a condensate pump 31, and is sent to the boiler 6 by a water supply pump 34 through a line 33.

As shown in FIG. 1, the carbon dioxide recovery plant 1b is provided with a known carbon dioxide separation and recovery plant 40 to which the exhaust gas 5 is supplied from the boiler 6 and which separates and recovers carbon dioxide contained in the exhaust gas 5. The carbon dioxide separation and recovery plant 40 includes an absorption tower (not shown) that absorbs carbon dioxide contained in the exhaust gas 5 into a carbon dioxide absorption liquid and a regeneration tower (not shown) to which the absorption liquid (rich liquid) absorbing the carbon dioxide is supplied from the absorption tower and which discharges a carbon dioxide gas 42 containing water vapor by emitting the carbon dioxide gas from the rich liquid and regenerates the absorption liquid. The absorption liquid regenerated in the regeneration tower is supplied to the absorption tower.

An amine compound aqueous solution, which is obtained by dissolving an amine compound in water, may be used as the absorption liquid that is used to absorb carbon dioxide.

The regeneration tower is provided with a reboiler 41. The reboiler 41 allows the temperature of the lean liquid (regenerated absorption liquid having a small content of carbon dioxide) to rise and produces steam by heating a part of the lean liquid stored in the regeneration tower and supplies the steam to the regeneration tower. When the lean liquid is heated in the reboiler 41, a carbon dioxide gas is discharged from the lean liquid, and is supplied to the regeneration tower together with the absorption liquid steam. The absorption liquid steam ascends in the regeneration tower, and heats the rich liquid. Therefore, the carbon dioxide gas is discharged from the rich liquid.

Steam 18, which is extracted or exhausted from the high-pressure turbine 21, the intermediate-pressure turbine 22, or the low-pressure turbine 23 and decreases in temperature to a temperature appropriate for heating a carbon dioxide absorption liquid by a temperature decreasing unit 44, is supplied to the reboiler 41. Any one of the steams of the high-pressure turbine 21, the intermediate-pressure turbine 22, or the low-pressure turbine 23 may be selected by valves 37 to 39.

The steam discharged from the reboiler 41 is joined as drainage to the appropriate position in the line 28 between the condensate pump 31 and the water supply pump 34.

As shown in FIG. 1, the carbon dioxide gas 42 containing water vapor discharged from the top portion of the regeneration tower of the carbon dioxide separation and recovery plant 40 is supplied to a $CO_2$ condenser (condenser) 51. The water vapor (moisture) condensed by the $CO_2$ condenser 51 is returned to the regeneration tower of the carbon dioxide separation and recovery plant 40 (not shown).

A carbon dioxide 52 from which the water vapor (moisture) is removed to increase purity by the $CO_2$ condenser is compressed by compressors 53 and 54 into a high pressure state (for example, approximately 8 MPa) which is appropriate to be injected into the ground. The carbon dioxide compressed by the compressor 53 is cooled by an intermediate cooler 55 and is compressed by the compressor 54. Further, the carbon dioxide 52 compressed by the compressor 54 is cooled by an exit cooler 56. When the intermediate cooler 55 and the exit cooler 56 are provided in this way, it is possible to improve the compressing efficiency and recover heat from the carbon dioxide 52 increasing in temperature with the compressing.

The compressors 53 and 54 are coaxially connected to a turbine (driving turbine) 57 and a motor 58 driving the compressors 53 and 54. The motor 58 is supplied with, for example, electric power generated by the generator 24. A turbine 57 is supplied with steam 62, which is generated by the heat-exchanging between cooling water 61 and the carbon dioxide gas 42 containing water vapor in the $CO_2$ condenser 51, and the steam is used to drive the turbine 57. Accordingly, the heat recovered by the $CO_2$ condenser 51 may be used as the power of the turbine 57, and may supplement a part of the power of the compressors 53 and 54.

The steam discharged from the turbine 57 is changed into condensate by a steam condenser 63, and is sent as the cooling water 61 to the $CO_2$ condenser 51 by a pump 64.

In this way, in the embodiment, the thermal energy of the carbon dioxide 42 emitted from the regeneration tower of the carbon dioxide separation and recovery plant 40 may be recovered, and the generated steam may be supplied to the compressor-driven turbine 57 so as to supplement a part of power of the compressors 53 and 54. For this reason, the carbon-dioxide-recovery-type steam power generation system 1 may efficiently recover the thermal energy and realize the high thermal efficiency. Further, the carbon-dioxide-recovery-type steam power generation system 1 may suppress degradation of the output of the steam power generation plant 1a in accordance with the ensured power source for compressing the carbon dioxide.

(Second Embodiment)

Figure 2:
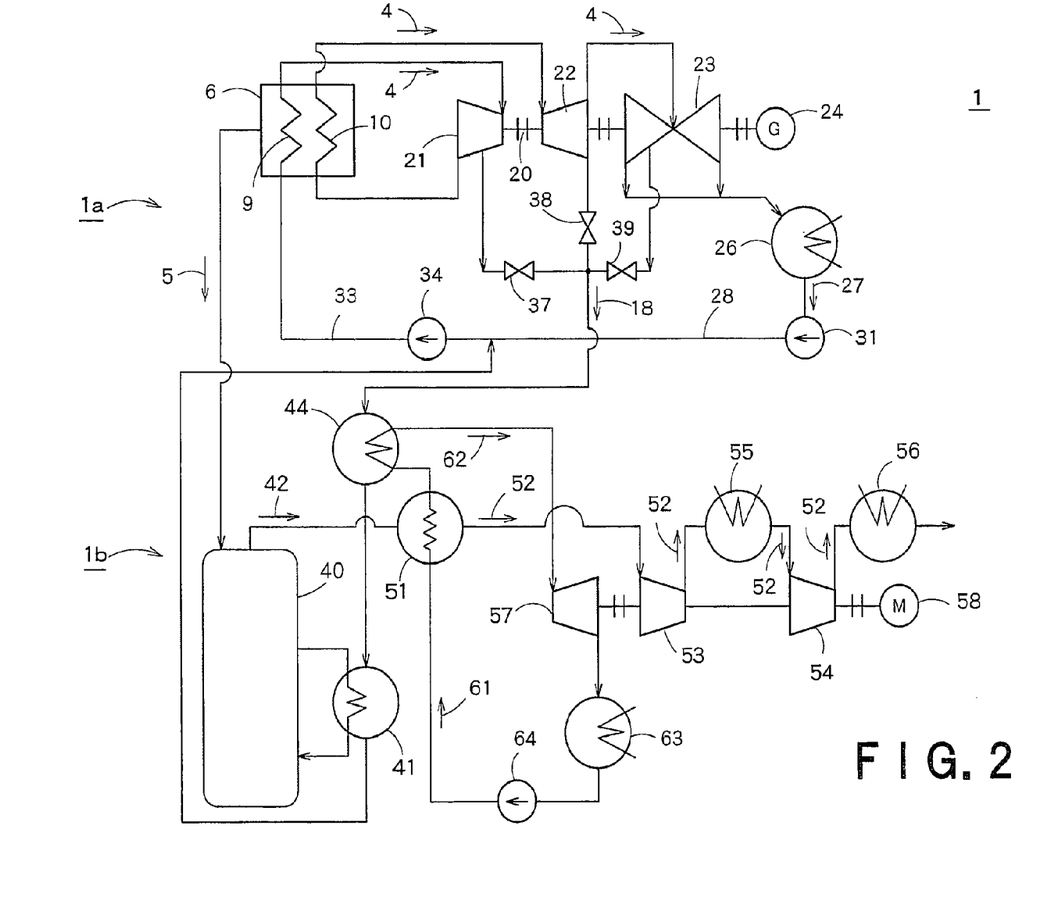
FIG. 2 is a diagram illustrating the schematic structure of a carbon-dioxide-recovery-type steam power generation system according to a second embodiment.

FIG. 2 illustrates a schematic structure of a carbon-dioxide-recovery-type steam power generation system according to a second embodiment. This embodiment is different from the first embodiment shown in FIG. 1 in that the cooling water 61 performs the heat exchanging between the carbon dioxide gas 42 containing water vapor and the steam 18 for heating the reboiler. In FIG. 2, the same portions as the portions of the first embodiment shown in FIG. 1 are denoted by the same reference numerals. The description thereof will not be repeated.

As shown in FIG. 2, the cooling water 61 exchanges heat with the carbon dioxide gas 42 containing water vapor in the $CO_2$ condenser 51, and then exchanges heat with the steam 18 which is a heat source of the reboiler 41 in the temperature decreasing unit 44. The steam 62 generated by the heat exchanging between the carbon dioxide gas 42 containing water vapor and the steam 18 is supplied to the turbine 57, and supplements a part of the power of the compressors 53 and 54. That is, in the embodiment, the steam 18 extracted or exhausted from the high-pressure turbine 21, the intermediate-pressure turbine 22, or the low-pressure turbine 23 is guided to the reboiler 41 so as to be used as a heat source of the absorption liquid used to absorb the carbon dioxide, and is also used as a heat source of the steam 62 which drives the turbine 57.

In this way, the carbon-dioxide-recovery-type steam power generation system 1 according to the embodiment may more efficiently recover the thermal energy and realize the higher thermal efficiency by recovering heat from the steam 18 for heating the reboiler.

(Third Embodiment)

Figure 3:
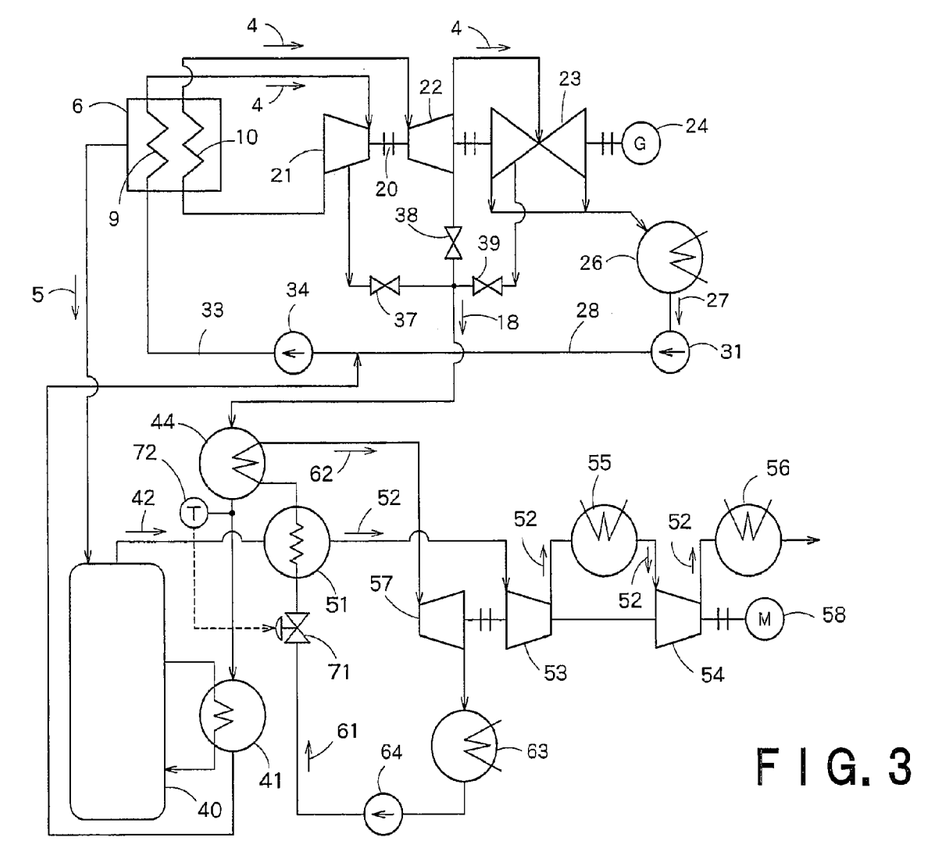
FIG. 3 is a diagram illustrating the schematic structure of a carbon-dioxide-recovery-type steam power generation system according to a third embodiment.

FIG. 3 illustrates a schematic structure of a carbon-dioxide-recovery-type steam power generation system according to a third embodiment. This embodiment is different from the second embodiment shown in FIG. 2 in that the system includes a valve 71 adjusting the flow rate of the cooling water 61 and a control unit 72 measuring the temperature of the steam 18 decreased in temperature by the temperature decreasing unit 44 and controlling the opening degree of the valve 71. In FIG. 3, the same portions as the portions of the second embodiment shown in FIG. 2 are denoted by the same reference numerals. The description thereof will not be repeated.

The valve 71 is provided between the pump 64 and the $CO_2$ condenser 51, and may change the flow rate of the cooling water 61 supplied to the $CO_2$ condenser 51 and the temperature decreasing unit 44, that is, the flow rate of the cooling water 61 exchanging heat with the carbon dioxide gas 42 containing water vapor and the steam 18 in accordance with the opening degree of the valve 71.

The control unit 72 measures the temperature of the steam 18 passing through the temperature decreasing unit 44, and controls the opening degree of the valve 71 so that the temperature of the steam 18 supplied to the reboiler 41 becomes a temperature necessary for emitting the carbon dioxide from the absorption liquid in the regeneration tower of the carbon dioxide separation and recovery plant 40.

Specifically, in the case where the measurement temperature of the steam 18 is higher than the necessary temperature, the opening degree of the valve 71 is made to be large so as to increase the flow rate of the cooling water 61. Accordingly, the amount of the cooling water 61 exchanging heat with the steam 18 in the temperature decreasing unit 44 increases, and hence the temperature of the steam 18 supplied to the reboiler 41 decreases.

On the other hand, in the case where the measurement temperature of the steam 18 is lower than the necessary temperature, the opening degree of the valve 71 is made to be small so as to decrease the flow rate of the cooling water 61. Accordingly, the amount of the cooling water 61 exchanging heat with the steam 18 in the temperature decreasing unit 44 decreases, and hence the temperature of the steam 18 supplied to the reboiler 41 increases.

In this way, the carbon-dioxide-recovery-type steam power generation system may recover the heat from the carbon dioxide gas 42 containing water vapor and the steam 18 for heating the reboiler and set the temperature of the steam 18 supplied to the reboiler 41 at a desired temperature by adjusting the flow rate of the cooling water 61 exchanging heat with the carbon dioxide gas 42 containing water vapor and the steam 18.

(Fourth Embodiment)

Figure 4:
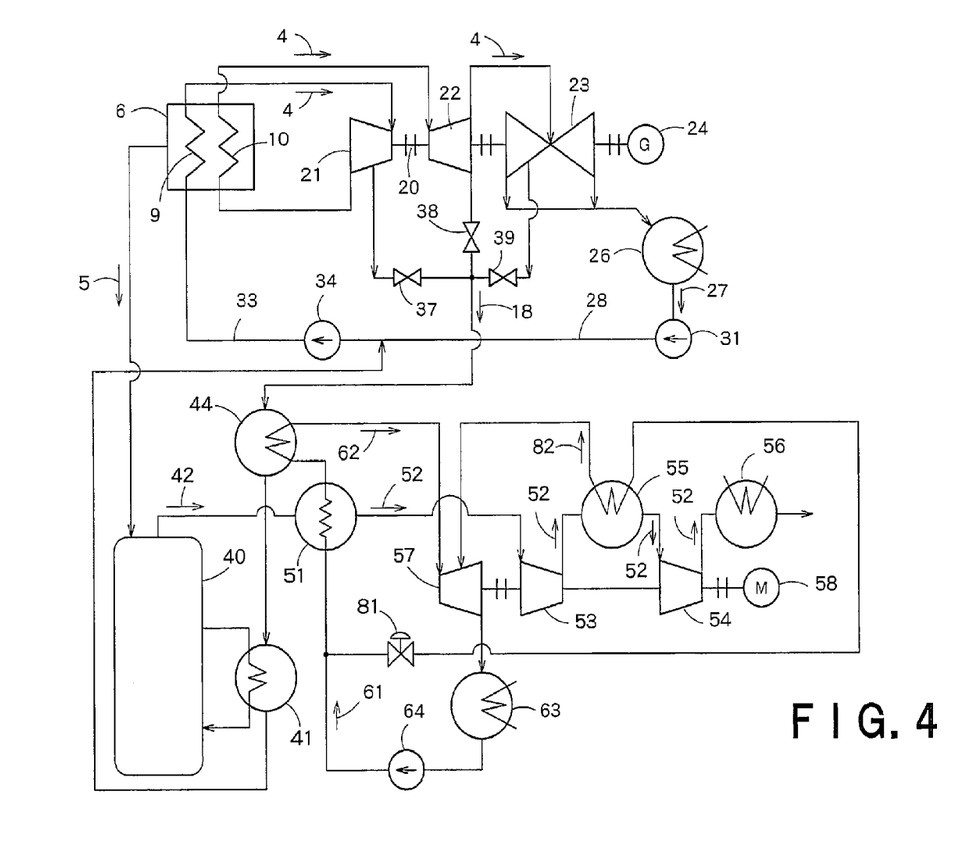
FIG. 4 is a diagram illustrating the schematic structure of a carbon-dioxide-recovery-type steam power generation system according to a fourth embodiment.

FIG. 4 illustrates a schematic structure of a carbon-dioxide-recovery-type steam power generation system according to a fourth embodiment. This embodiment is different from the second embodiment shown in FIG. 2 in that steam 82 generated by branching a part of the cooling water 61 and causing heat-exchanging with the carbon dioxide 52 in the intermediate cooler 55 is supplied to the turbine 57. In FIG. 4, the same portions as the portions of the second embodiment shown in FIG. 2 are denoted by the same reference numerals. The description thereof will not be repeated.

The cooling water 61 supplied from the pump 64 is branched, so that one part of the cooling water is supplied to the $CO_2$ condenser 51 and the other part of the cooling water is supplied to the intermediate cooler 55. The flow rate of the cooling water 61 supplied to the intermediate cooler 55 may be adjusted by a valve 81.

The cooling water 61 supplied to the intermediate cooler exchanges heat with the carbon dioxide 52 with high temperature (for example, heated up to approximately 200 to 250° C.) compressed by the compressor 53, so that the steam 82 is generated. The steam 82 is supplied to the turbine 57, and is used to drive the turbine 57. Accordingly, the heat recovered by the intermediate cooler 55 may be used as the power of the turbine 57, and may supplement a part of the power of the compressors 53 and 54.

In this way, it is possible to efficiently recover the thermal energy and realize the high thermal efficiency by recovering heat from the compressed carbon dioxide 52.

In the structure shown in FIG. 4, the branched cooling water 61 exchanges heat with the carbon dioxide 52 compressed by the compressor 53 in the intermediate cooler 55, but may exchange heat with the carbon dioxide 52 compressed by the compressor 54 in the exit cooler 56. Further, the heat exchanging may be performed in the intermediate cooler 55 after the heat exchanging in the exit cooler 56.

Figure 5:
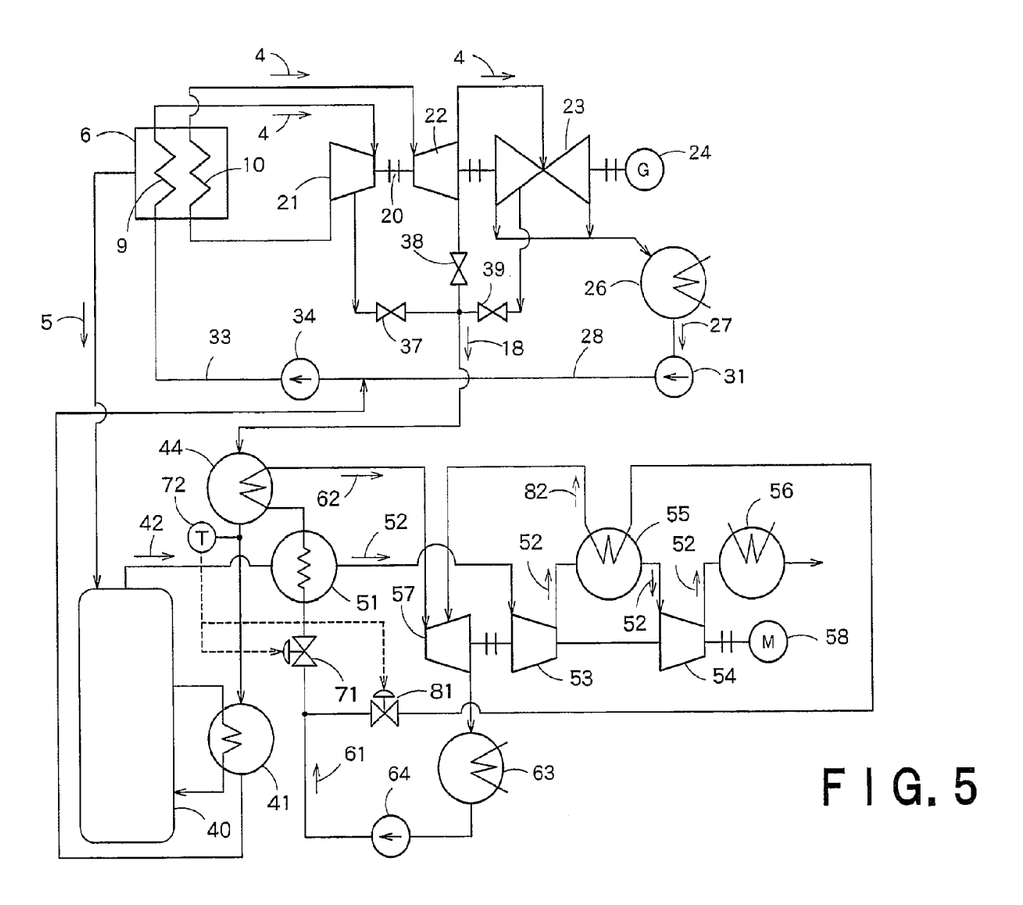
FIG. 5 is a diagram illustrating the schematic structure of a carbon-dioxide-recovery-type steam power generation system according to a modified example.

Furthermore, the carbon-dioxide-recovery-type steam power generation system according to the embodiment may further includes the valve 71 and the control unit 72 described in the third embodiment. Such a structure is shown in FIG. 5. Furthermore, the control unit 72 may be configured to control the opening degree of the valve 81.

In the first to fourth embodiments, the cooling water 61 is used so as to recover heat from the carbon dioxide gas 42 containing water vapor or the steam 18 for heating the reboiler, but a medium with a low boiling point such as ammonia may be used.

(Fifth Embodiment)

Figure 6:
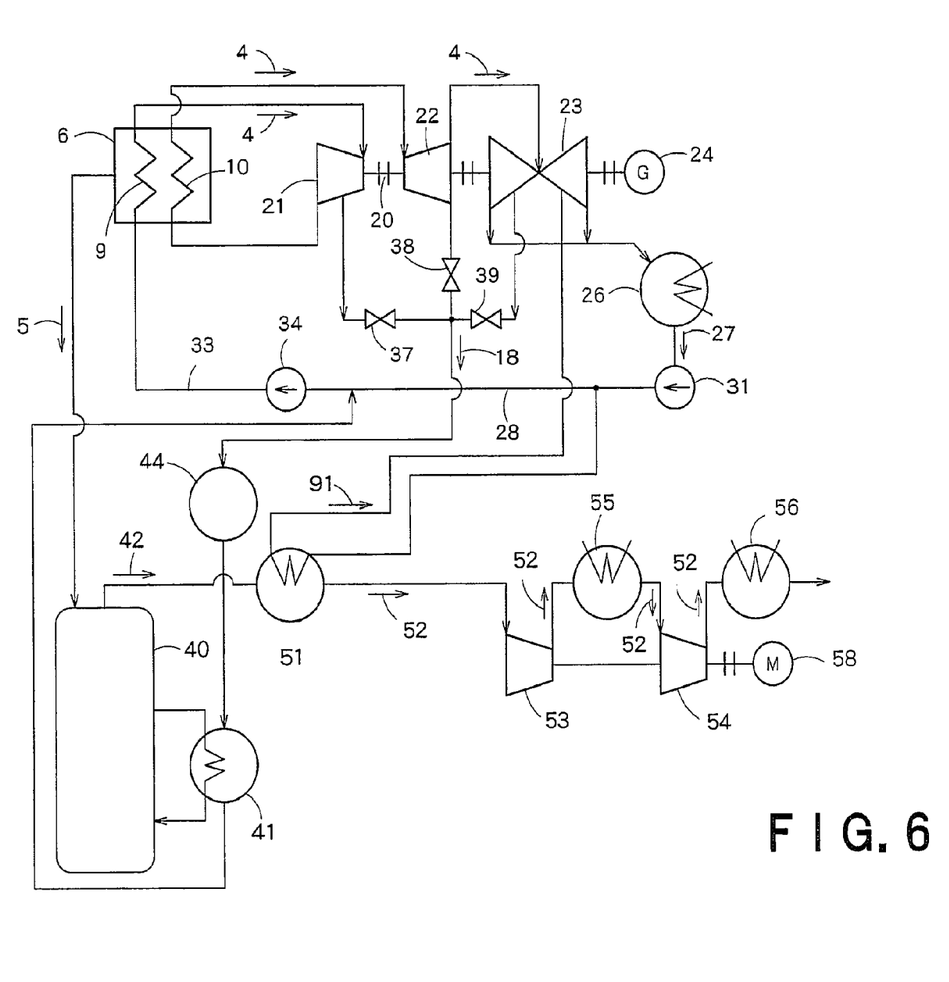
FIG. 6 is a diagram illustrating the schematic structure of a carbon-dioxide-recovery-type steam power generation system according to a fifth embodiment.

FIG. 6 illustrates a schematic structure of a carbon-dioxide-recovery-type steam power generation system according to a fifth embodiment. This embodiment is different from the first embodiment shown in FIG. 1 in that a part of the condensate 27 is used to exchange heat with the carbon dioxide gas 42 containing water vapor and generated steam 91 is supplied to the low-pressure turbine 23. In FIG. 6, the same portions as the portions of the first embodiment shown in FIG. 1 are denoted by the same reference numerals. The description thereof will not be repeated. Further, in FIG. 6, the turbine 57 driving the compressors 53 and 54 are not shown.

As shown in FIG. 6, the steam 91 is obtained in such a manner that the cooling water (condensate 27) branched from the line 28 at the downstream side of the condensate pump 31 recovers the heat of the carbon dioxide gas 42 containing water vapor in the $CO_2$ condenser 51, and the steam 91 is supplied to the low-pressure turbine 23. The steam 91 supplied to the low-pressure turbine 23 is used as steam for driving the low-pressure turbine 23. It is possible to increase the output of the steam power generation plant is by using the thermal energy included in the carbon dioxide gas 42 containing water vapor emitted from the regeneration tower of the carbon dioxide separation and recovery plant 40 as the driving energy of the low-pressure turbine 23.

In this way, according to the embodiment, the carbon-dioxide-recovery-type steam power generation system may exchange heat with the carbon dioxide gas 42 containing water vapor using a part of the condensate 27 and use the generated steam 91 as a part of the steam for driving the low-pressure turbine 23. Accordingly, it is possible to efficiently recover the thermal energy and realize the high thermal efficiency.

(Sixth Embodiment)

Figure 7:
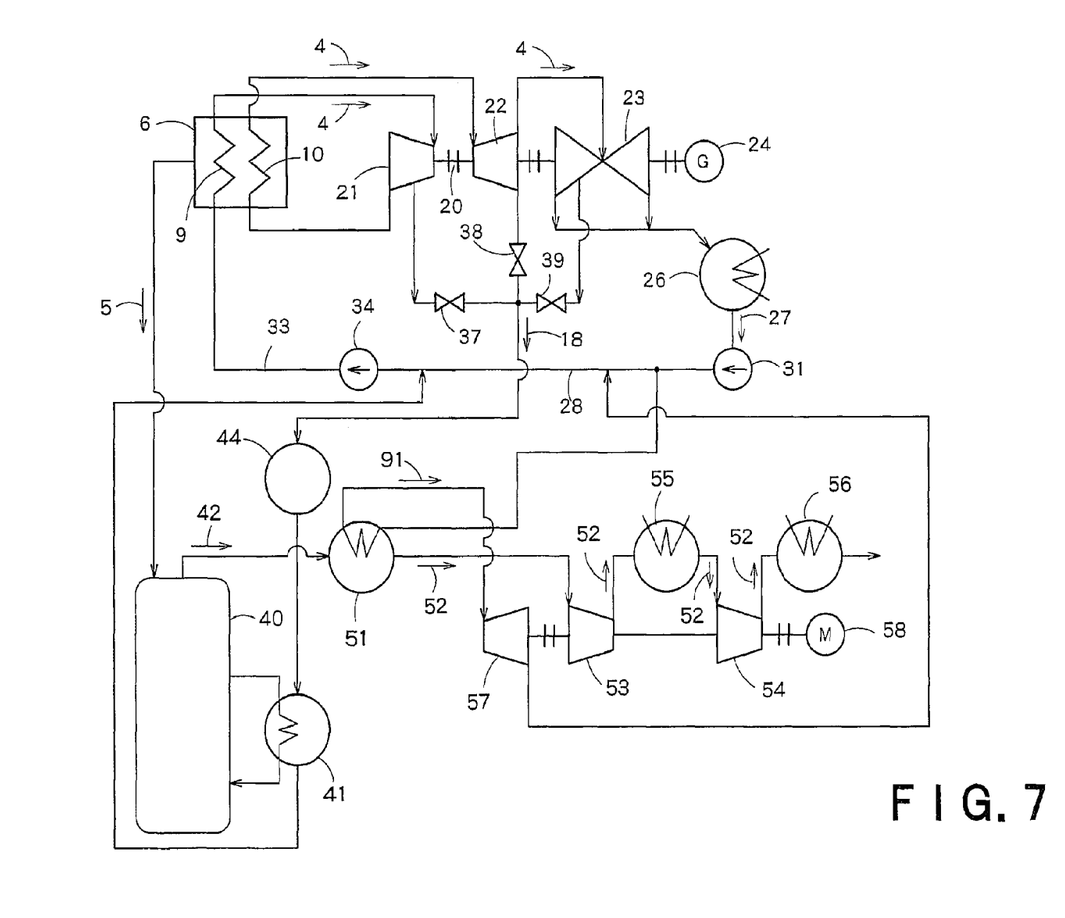
FIG. 7 is a diagram illustrating the schematic structure of a carbon-dioxide-recovery-type steam power generation system according to a sixth embodiment.

FIG. 7 illustrates a schematic structure of a carbon-dioxide-recovery-type steam power generation system according to a sixth embodiment. This embodiment is different from the fifth embodiment shown in FIG. 6 in that the steam 91 is supplied to the turbine 57 driving the compressors 53 and 54. In FIG. 7, the same portions as the portions of the fifth embodiment shown in FIG. 6 are denoted by the same reference numerals. The description thereof will not be repeated.

As shown in FIG. 7, the steam 91, which is generated by the heat exchanging between a part of the condensate 27 in the $CO_2$ condenser 51 and the carbon dioxide gas 42 containing water vapor is supplied to the turbine 57. The steam 91 is used to drive the turbine 57. Accordingly, the heat recovered by the $CO_2$ condenser 51 may be used as the power of the turbine 57, and may supplement a part of the power of the compressors 53 and 54.

The steam discharged from the turbine 57 is joined as drainage to an appropriate position of the line 28 between the condensate pump 31 and the water supply pump 34.

In this way, in the embodiment, the thermal energy of the carbon dioxide 42 emitted from the regeneration tower of the carbon dioxide separation and recovery plant 40 is recovered, and the generated steam is supplied to the compressor-driven turbine 57, so that a part of the power of the compressors 53 and 54 may be supplemented. For this reason, the carbon-dioxide-recovery-type steam power generation system 1 may efficiently recover the thermal energy and realize the high thermal efficiency. Further, the carbon-dioxide-recovery-type steam power generation system 1 may suppress degradation of the output of the steam power generation plant 1a in accordance with the ensured power source for compressing carbon dioxide.

In the first to sixth embodiments, a structure is shown in which two compressors compressing the carbon dioxide and two coolers cooling the compressed carbon dioxide are provided, but the number thereof may be one or three or more.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A carbon-dioxide-recovery-type steam power generation system, comprising:
   a boiler that produces steam and generates an exhaust gas by combusting fuel;
   a first turbine that is connected to a generator and is rotationally driven by the steam supplied from the boiler;
   an absorption tower that is supplied with the exhaust gas from the boiler and allows carbon dioxide contained in the exhaust gas to be absorbed into an absorption liquid;
   a regeneration tower that is supplied with the absorption liquid absorbing the carbon dioxide from the absorption tower, discharges a carbon dioxide gas from the absorption liquid, and discharges the carbon dioxide gas;
   a reboiler that heats the absorption liquid from the regeneration tower and supplies the generated steam to the regeneration tower;
   a condenser that removes moisture from the carbon dioxide gas, discharged from the regeneration tower, by condensing the carbon dioxide gas using a cooling medium;
   a compressor that compresses the carbon dioxide gas from which the moisture is removed by the condenser; and
   a second turbine that drives the compressor,
   wherein steam produced by the cooling medium recovering the heat from the carbon dioxide gas in the condenser is supplied to the first turbine or the second turbine.

2. The carbon-dioxide-recovery-type steam power generation system according to claim 1, further comprising:
   a steam condenser that produces the cooling medium by cooling and condensing exhaust steam from the second turbine.

3. The carbon-dioxide-recovery-type steam power generation system according to claim 1, further comprising:
   a temperature decreasing unit that decreases the temperature of the steam from the first turbine and supplies the steam to the reboiler,
   wherein the cooling medium recovers the heat from the carbon dioxide gas in the condenser, and thereafter, recovers the heat from the steam from the first turbine in the temperature decreasing unit.

4. The carbon-dioxide-recovery-type steam power generation system according to claim 3, further comprising:
   a control unit that measures the temperature of the steam decreased in temperature by the temperature decreasing unit and controls the flow rate of the cooling medium supplied to the condenser based on the measurement result.

5. The carbon-dioxide-recovery-type steam power generation system according to claim 1, further comprising:
   a cooler to which a part of the cooling medium is supplied and which cools the carbon dioxide gas compressed by the compressor,
   wherein the steam produced by cooling the carbon dioxide gas in the cooler is supplied to the second turbine.

6. The carbon-dioxide-recovery-type steam power generation system according to claim 1,
   wherein the boiler includes a superheater generating main steam and a reheater generating reheat steam,
   the first turbine includes a high-pressure turbine rotationally driven by the main steam supplied thereto, an intermediate-pressure turbine rotationally driven by the reheat steam supplied thereto, and a low-pressure turbine rotationally driven by the exhaust steam supplied thereto from the intermediate-pressure turbine,
   the cooling medium is a part of a condensate produced by cooling and condensing the exhaust steam from the low-pressure turbine, and
   the steam produced in the condenser is supplied to the low-pressure turbine.

7. The carbon-dioxide-recovery-type steam power generation system according to claim 1,
   wherein the cooling medium is a part of a condensate produced by cooling and condensing the exhaust steam from the first turbine, and
   the steam produced in the condenser is supplied to the second turbine.

8. A carbon dioxide recovery method, comprising:
   producing steam, which drives a turbine, and generating an exhaust gas by combusting fuel;
   allowing carbon dioxide, which is contained in the exhaust gas, to be absorbed into an absorption liquid;

emitting a carbon dioxide gas by heating the absorption liquid absorbing the carbon dioxide and discharging the carbon dioxide gas;

cooling the discharged carbon dioxide gas using a cooling medium and removing moisture from the carbon dioxide gas by condensing the moisture;

compressing the carbon dioxide gas, from which moisture is removed, using a compressor; and supplying steam generated by the cooling medium recovering heat at the time of condensing the moisture from the carbon dioxide gas to a driving turbine driving the compressor or the turbine.

9. The carbon dioxide recovery method according to claim 8, wherein the cooling medium is produced by cooling and condensing an exhaust steam from the driving turbine.

10. The carbon dioxide recovery method according to claim 8, wherein the steam from the turbine is used as a heat source of the absorption liquid and a heat source of the steam generated by the cooling medium recovering heat at the time of condensing the moisture.

11. The carbon dioxide recovery method according to claim 10, wherein the temperature of the steam decreased in temperature by a temperature decreasing unit is measured, and the flow rate of the cooling medium is controlled based on the temperature measurement result.

12. The carbon dioxide recovery method according to claim 8, wherein a part of the cooling medium is used to cool the carbon dioxide gas compressed by the compressor.

13. The carbon dioxide recovery method according to claim 8, wherein the cooling medium is a part of a condensate generated by cooling and condensing the exhaust steam from the turbine, and the steam generated by the cooling medium recovering heat at the time of condensing the moisture is supplied to the turbine.

14. The carbon dioxide recovery method according to claim 8, wherein the cooling medium is a part of a condensate generated by cooling and condensing the exhaust steam from the turbine, and the steam generated by the cooling medium recovering heat at the time of condensing the moisture is supplied to the driving turbine.

* * * * *